(12) United States Patent
Atohira

(10) Patent No.: US 9,104,193 B2
(45) Date of Patent: Aug. 11, 2015

(54) ROBOT PROGRAMMING DEVICE

(75) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 13/587,191

(22) Filed: Aug. 16, 2012

(65) Prior Publication Data

US 2013/0116822 A1 May 9, 2013

(30) Foreign Application Priority Data

Nov. 8, 2011 (JP) .................................. 2011-244590

(51) Int. Cl.
G05B 19/4097 (2006.01)
B25J 9/16 (2006.01)
G05B 19/4061 (2006.01)

(52) U.S. Cl.
CPC .......... *G05B 19/4097* (2013.01); *B25J 9/1671* (2013.01); *G05B 19/4061* (2013.01); *G05B 2219/40107* (2013.01); *G05B 2219/40317* (2013.01); *G05B 2219/40507* (2013.01)

(58) Field of Classification Search
CPC ............ G05B 1919/4097; G05B 19/04; B25J 9/1671; G06F 19/00
USPC ................................................. 700/245, 255
See application file for complete search history.

(56) References Cited

U.S. PATENT DOCUMENTS

| | | | |
|---|---|---|---|
| 6,631,308 B1 * | 10/2003 | Kaneko et al. | ................. 700/257 |
| 7,110,859 B2 | 9/2006 | Shibata et al. | |
| 2006/0276934 A1 * | 12/2006 | Nihei et al. | .................... 700/245 |
| 2008/0300723 A1 * | 12/2008 | Ban et al. | ........................ 700/259 |
| 2010/0145520 A1 * | 6/2010 | Gerio et al. | .................... 700/264 |
| 2010/0305745 A1 | 12/2010 | Iriguchi et al. | |
| 2011/0087373 A1 * | 4/2011 | Nagatsuka et al. | ............ 700/254 |
| 2011/0224815 A1 * | 9/2011 | Sonner et al. | .................... 700/97 |

FOREIGN PATENT DOCUMENTS

| | | | | |
|---|---|---|---|---|
| GB | 2473129 A | * | 2/2011 | ................. B25J 9/22 |
| JP | 4-169909 A | | 6/1992 | |
| JP | 2752784 B2 | | 5/1998 | |
| JP | 2910471 B2 | | 6/1999 | |
| JP | 3190737 B2 | | 7/2001 | |

(Continued)

OTHER PUBLICATIONS

Office Action corresponding to JP2011-244590, dated Dec. 18, 2012.

*Primary Examiner* — Thomas G Black
*Assistant Examiner* — Ana Thomas
(74) *Attorney, Agent, or Firm* — Lowe Hauptman & Ham, LLP

(57) ABSTRACT

A robot programming device (10) includes: a processing line designating unit (21) that designates a processing line (41); an operation mode designating unit (22) that designates an operation mode of the teaching point; a program generation unit (23) that generates a program for a robot (12) based on the processing line and the operation mode; an interference target designating unit (24) that designates a tool non-processing part as an interference target; an interference detection unit (25) that detects interference between the robot and the workpiece, at a teaching point; a non-interference position search unit (26) that searches for a non-interference position; and a correction unit (27) that corrects a position of the teaching point based on a search result.

11 Claims, 9 Drawing Sheets

(56) References Cited

FOREIGN PATENT DOCUMENTS

| | | | |
|---|---|---|---|
| JP | 2001-312308 A | 11/2001 |
| JP | 3639873 B2 | 4/2005 |
| JP | 3715537 B2 | 11/2005 |
| JP | 2010-218036 A | 9/2010 |
| WO | 2009-028056 A1 | 3/2009 |

* cited by examiner

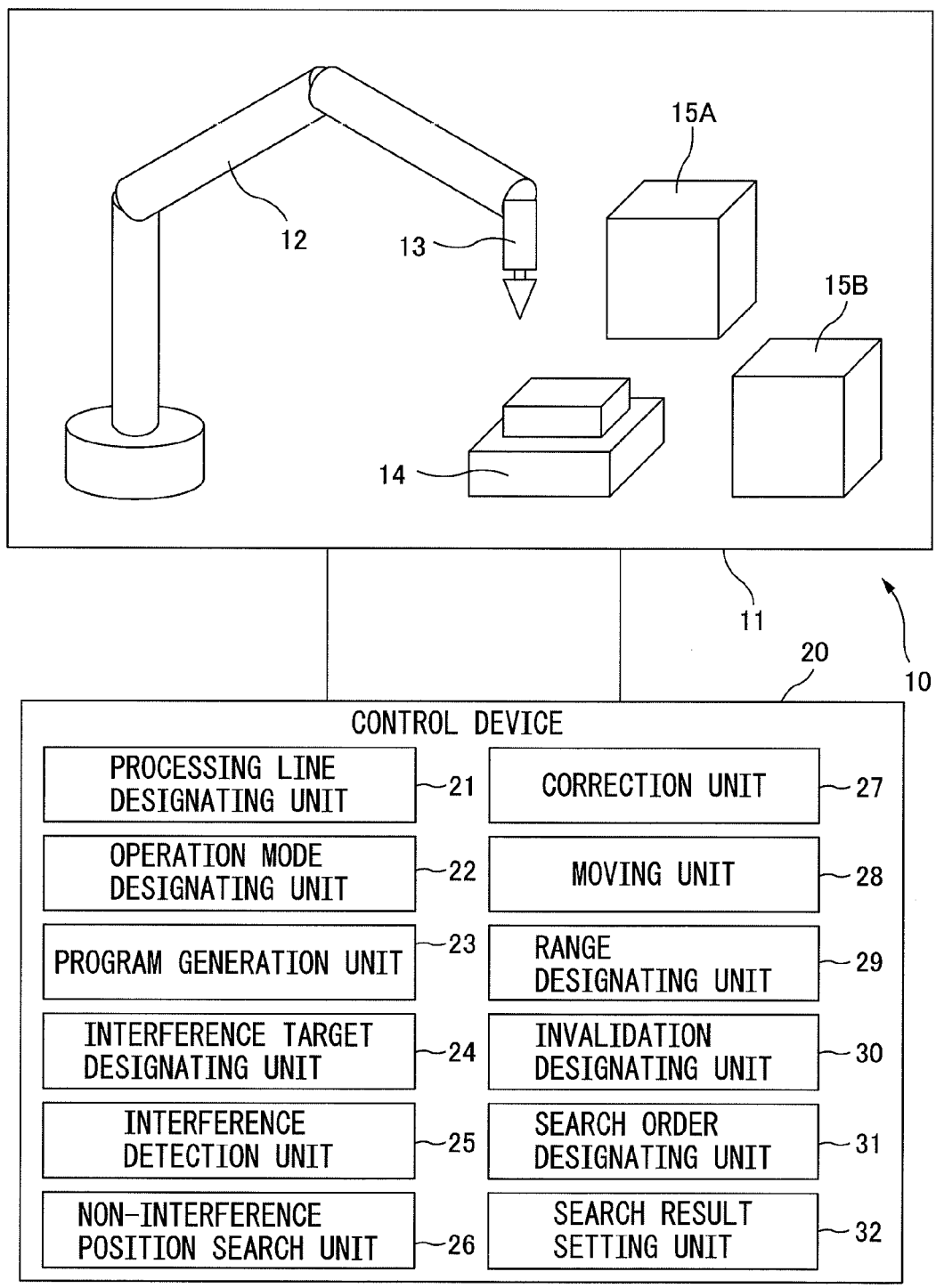

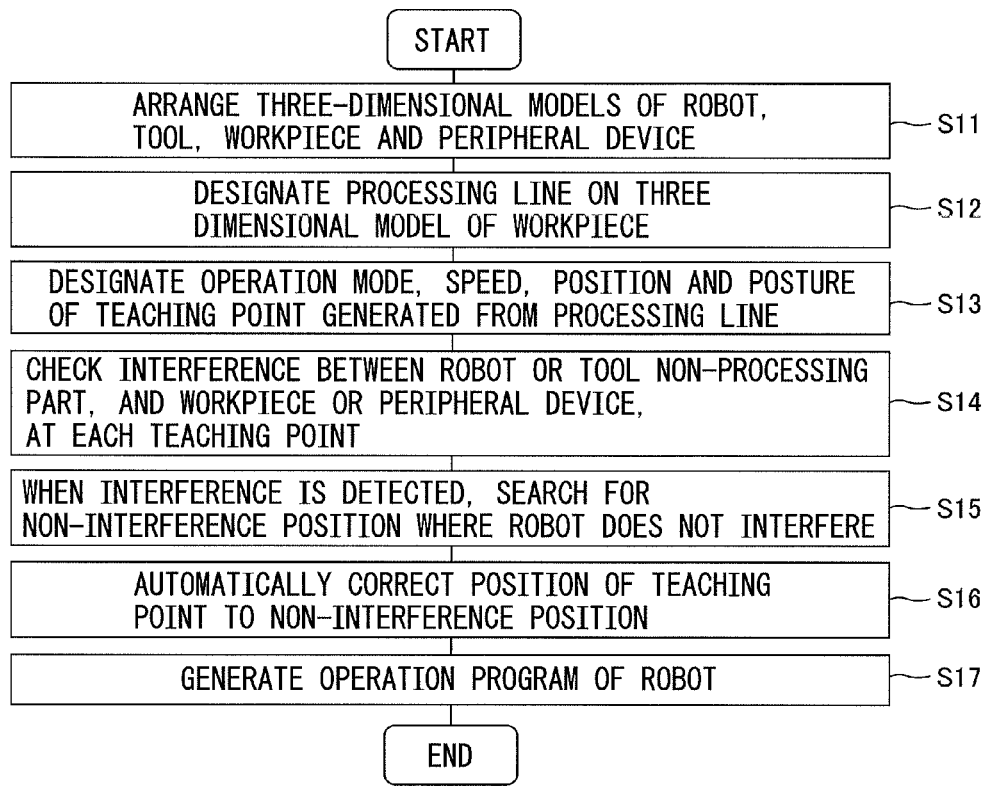
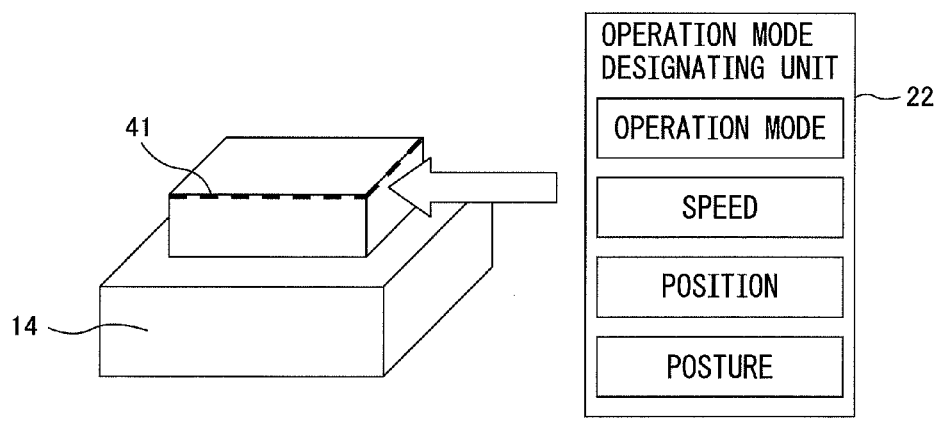

ROBOT PROGRAMMING DEVICE

RELATED APPLICATIONS

The present application is based on, and claims priority from, Japanese Application Number 2011-244590, filed Nov. 8, 2011, the disclosure of which is hereby incorporated by reference herein in its entirety.

BACKGROUND OF THE INVENTION

1. Technical Field

The present invention relates to a robot programming device that operates offline and teaches a robot operation program for arranging and displaying three-dimensional models of a robot on which a tool is mounted, a workpiece, and at least one peripheral device, on a screen, at the same time, and for allowing the tool or the robot to avoid interfering with the workpiece or the peripheral device, and perform processing work of the workpiece.

2. Description of Related Arts

In recent years, there have been increasing cases of employing an offline programming scheme for teaching operation of a robot. According to this scheme, processing lines, where a workpiece should be processed, are designated on a CAD model of the workpiece, and conditions such as the tool's posture and operation speed are designated, and teaching points are generated. The operator then makes corrections by checking interference between the robot or a tool non-processing part, and the workpiece or a peripheral device, at each teaching point.

Also, when the robot on a three-dimensional space is moved to a certain position and interference is detected between the robot or the tool non-processing part and the workpiece or the peripheral device, the operator makes slight adjustment of the position of the robot such that the robot or the tool non-processing part and the workpiece or the peripheral device do not interfere with each other. In this connection, refer, for example, Japanese Patent Publication No. 3639873, Japanese Patent Publication No. 3190737, Japanese Patent Publication No. 3715537, Japanese Patent Publication No. 2910471, Japanese Patent Publication No. 2752784, and Japanese Unexamined Patent Publication No. H4-169909.

However, upon generating teaching points on the CAD model of the workpiece, interference between the robot or the tool non-processing part and the workpiece or the peripheral device at each teaching point is not taken into consideration. Consequently, after generating the teaching points, the operator has to make corrections with respect to each teaching point, and therefore the correction work requires a significant amount of time.

In addition, in the event the robot is moved to a certain position on the three-dimensional space and interference is detected, the operator has to make slight adjustment to the position of the robot such that the robot or the tool non-processing part and the workpiece or the peripheral device do not interfere with each other. Consequently, the adjustment work on the three-dimensional space also requires a significant amount of time.

The present invention has been made in view of the above problems and it is therefore an object of the present invention to provide a robot offline programming device that can eliminate correction work in which the operator corrects interference, even when teaching points are generated on a CAD model of a workpiece and when a robot is moved to a certain position on a three-dimensional space.

SUMMARY OF THE INVENTION

To achieve the above object, according to the first mode, a robot programming device is provided that teaches a robot operation program for arranging and displaying three-dimensional models of a robot on which a tool is mounted, a workpiece, and at least one peripheral device, on a screen, at the same time, and for allowing the tool or the robot to avoid interfering with the workpiece or the peripheral device and perform processing work of the workpiece, and this robot programming device includes: a processing line designating unit that designates a processing line on a three-dimensional model of the workpiece; an operation mode designating unit that designates an operation mode, speed, position, and posture of a teaching point that is generated based on the processing line designated by the processing line designating unit; a program generation unit that generates an operation program for the robot based on the processing line that is designated by the processing line designating unit and the operation mode, speed, position, and posture that are designated by the operation mode designating unit; an interference target designating unit that, when the tool directly contacts and processes the workpiece or when the tool closely processes the workpiece, designates a tool non-processing part that is apart from one part in a three-dimensional model of the tool that directly contacts the workpiece or is close to the workpiece, as an interference target; an interference detection unit that detects interference between the robot or the tool non-processing part, and the workpiece or the peripheral device, at the teaching point in the operation program; a non-interference position search unit that, when the interference detection unit detects interference, searches for a non-interference position where the robot or the tool non-processing part, and the workpiece or the peripheral device, do not interfere with each other, by carrying out at least one of translatory movement of a tool tip point of the tool of the robot from a position of the robot upon interference, and rotational motion of the robot about the tool tip point; and a correction unit that corrects a position of the teaching point based on a search result by the non-interference position search unit.

According to a second mode, based on the first mode, the workpiece is held by another robot that is provided as the peripheral device.

According to a third mode, based on the first mode, the workpiece is held by a positioner that is provided as the peripheral device.

According to the fourth mode, a robot programming device is provided that teaches a robot operation program for arranging and displaying three-dimensional models of a robot on which a tool is mounted, a workpiece, and at least one peripheral device, on a screen, at the same time, and for allowing the tool or the robot to avoid interfering with the workpiece or the peripheral device and perform processing work of the workpiece, and this robot programming device includes: a moving unit that moves the robot to a designated position on a three-dimensional space; an interference target designating unit that, when the tool directly contacts and processes the workpiece or when the tool closely processes the workpiece, designates a tool non-processing part that is apart from one part in a three-dimensional model of the tool that directly contacts the workpiece or is close to the workpiece, as an interference target; an interference detection unit that detects interference between the robot or the tool non-processing part, and the workpiece or the peripheral device, at the designated position; a non-interference position search unit that, when the interference detection unit detects interference, searches for a non-interference position where the robot or the tool non-processing part, and the workpiece or the peripheral device, do not interfere with each other, by carrying out at least one of translatory movement of a tool tip point of the tool of the robot from a position of the robot upon interference, and rotational motion of the robot about the tool tip point; and a correction unit that corrects a position of the designated position based on a search result by the non-interference position search unit.

According to a fifth mode, based on one of the first to fourth modes above, a range designating unit that designates a translation range of the translatory movement and a rotation range of the rotational motion is included.

According to a sixth mode, based on one of the first to fifth modes above, an invalidation designating unit that invalidates search by the translatory movement and the rotational motion in a predetermined direction is included.

According to a seventh mode, based on one of the first to sixth modes above, a search order designating unit that designates an order of search such that search by the translatory movement and the rotational motion in a predetermined direction is carried out preferentially is included.

According to an eighth mode, based on one of the first to seventh modes, a search result setting unit that, when a plurality of non-interference positions are detected by the non-interference position search unit, sets a non-interference position that is found first as a search result, or sets a non-interference position where a difference from positions of the robot corresponding respectively to the plurality of non-interference positions is minimum as the search result, is included.

The objects, features, and characteristics of this invention other than those set forth above will be apparent from the description given herein below with reference to preferred embodiments illustrated in the accompanying drawings.

BRIEF DESCRIPTION OF THE DRAWINGS

FIG. 1 is a conceptual diagram of a robot programming device based on a first embodiment of the present invention;

FIG. 2 is a flowchart illustrating operations of the robot programming device illustrated in FIG. 1;

FIG. 3 is a diagram illustrating a three-dimensional model of a workpiece;

DETAILED DESCRIPTION

Figure 4A:
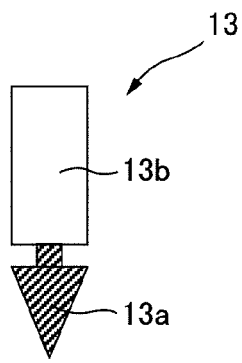
FIG. 4A is a diagram illustrating a three-dimensional model of a tool.

Embodiments of the present invention will be described below in detail with reference to the accompanying drawings. In the following drawings, the same members are assigned the same reference codes. The scale in these drawings is changed as appropriate for ease of explanation.

FIG. 1 is a conceptual diagram of a robot programming device based on the first embodiment of the present invention. The robot programming device 10 primarily includes a display unit 11 (for example, a liquid crystal display, a CRT, etc.) and a control device 20 (for example, a digital computer) that is connected to the display unit 11.

In FIG. 1, the display unit 11 displays a three-dimensional model of a robot 12 (for example, an articulated robot) and a three-dimensional model of a tool 13 that is attached to the tip of the robot 12. The tool 13 varies depending on what work the robot 12 performs (for example, deburring work, arc welding, etc.).

Furthermore, the display unit 11 also displays a three-dimensional model of a workpiece 14 that is to be processed by the tool 13, and three-dimensional models of peripheral devices 15A and 15B. Note that, in the following, the three-dimensional model of the robot 12 may be simply referred to as "robot 12," and the same applies to other members and other parts.

As illustrated in FIG. 1, the control device 20 of the robot programming device 10 plays the roles of a processing line designating unit 21 that designates a processing line on the three-dimensional model of the workpiece 14, an operation mode designating unit 22 that designates the operation mode, speed, position, and posture of a teaching point that is generated based on the processing line designated by the processing line designating unit 21, and a program generation unit 23 that generates an operation program for the robot 12 based on the processing line that is designated by the processing line designating unit 21, and the operation mode, speed, position, and posture that are designated by the operation mode designating unit 22.

Furthermore, the control device 20 plays the role of an interference target designating unit 24 that, in the event the tool 13 directly contacts and processes the workpiece 14 or in the event the tool 13 closely processes the workpiece 14, designates a tool non-processing part, other than the one part in the three-dimensional model of the tool 13 that directly contacts the workpiece 14 or is close to the workpiece 14, as an interference target.

Furthermore, the control device 20 plays the role of an interference detection unit 25 that detects interference between the robot 12 or the tool non-processing part and the workpiece 14 or the peripheral devices 15A and 15B, at teaching points in the operation program. Furthermore, in the event the interference detection unit 25 detects interference, the control device 20 plays the role of a non-interference position search unit 26 that searches for a non-interference position where the robot 12 or the tool non-processing part and the workpiece 14 or the peripheral devices 15A and 15B do not interfere with each other, by carrying out at least one of translatory movement of the tool tip point 13c of the tool 13 of the robot 12 from the position of the robot 12 upon interference, and rotational motion of the robot 12 about the tool tip point 13c. Furthermore, the control device 20 plays the role of a correction unit 27 that corrects the position of a teaching point and a designated position, based on the search result by the non-interference position search unit 26.

In addition, the control device 20 also plays the role of a moving unit 28 that moves the robot 12 to a designated position on a three-dimensional space. Then, the control device 20 plays the roles of a range designating unit 29 that designates the translation range of the translatory movement and the rotation range of the rotational motion, an invalidation designating unit 30 that invalidates search by translatory movement and rotational motion in a predetermined direction, and a search order designating unit 31 that designates the order of search such that search by translatory movement and rotational motion in a predetermined direction is performed preferentially.

Furthermore, in the event a plurality of non-interference positions are detected by the non-interference position search unit 26, the control device 20 also plays the role of a search result setting unit 32 that sets the non-interference position that is found first as a search result, or that sets the non-interference position where the difference between the plurality of non-interference positions and the positions of the robot 12 corresponding to them, is the minimum, as a search result. Note that the control device 20 also includes a storage unit (not illustrated) that stores various data.

FIG. 2 is a flowchart illustrating the operations of the robot programming device illustrated in FIG. 1. Offline generation of the operation program of the robot 12 by the robot programming device 10 will be described below with reference to FIG. 2.

In step S11 of FIG. 2, three-dimensional models of the robot 12, tool 13, workpiece 14 and peripheral devices 15A and 15B are displayed on the display unit 11. The position relationships of these parts are learned in advance, and, on the display unit 11, the three-dimensional models of the robot 12 and others are displayed in the position relationships learned in advance.

Then, in step S12, the processing line designating unit 21 designates a processing line on the three-dimensional model of the workpiece 14. The processing line is a line where the workpiece 14 is to be processed by the tool 13. In FIG. 3 to illustrate the three-dimensional model of the workpiece, one part of the edge parts of the top surface of the workpiece 14 is designated as a processing line 41 by the processing line designating unit 21.

Figure 5:
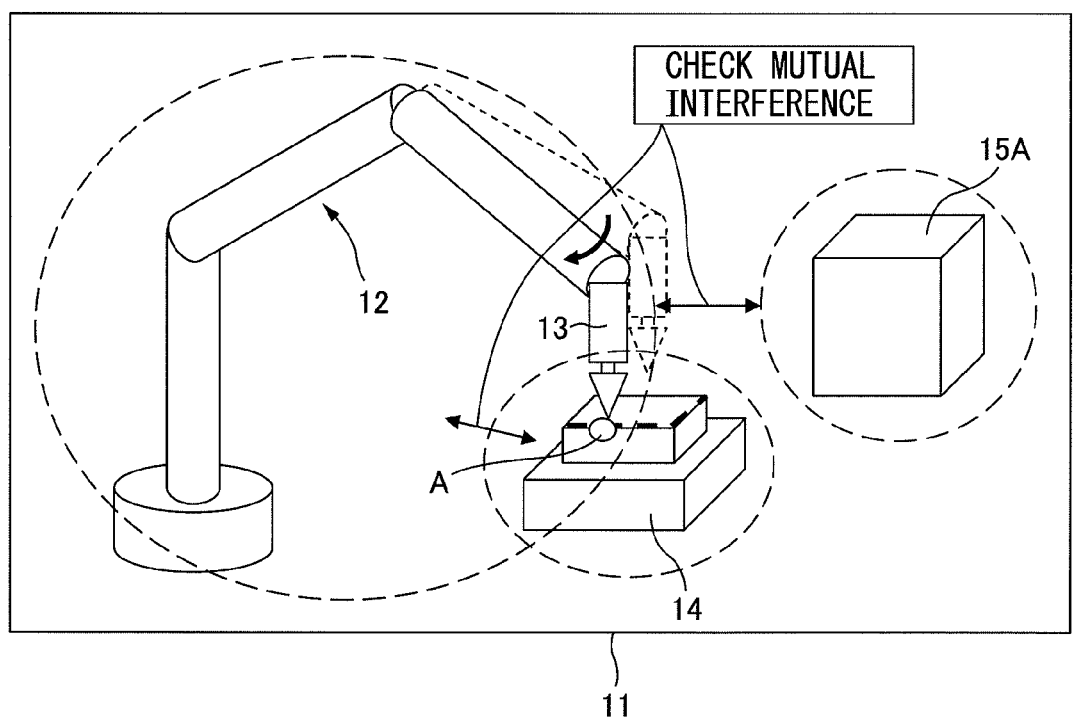
FIG. 5 is a conceptual diagram for explaining interference check according to the first embodiment.

Furthermore, in step S13, the operation mode designating unit 22 generates the teaching points A of the robot based on the processing line 41, and designates the operation mode, speed, position, and posture of each teaching point A (see, for example, FIG. 3). The operation mode is, for example, the movement on each axis or linear movement. As illustrated in FIG. 5, which will be described later, a teaching point A is located on the processing line 41.

Then, the program generation unit 23 generates an operation program of the robot 12 by a known technique, based on the processing line 41 that is designated by the processing line designating unit 21, and based on the operation mode, speed, position and posture of the teaching point A that is designated by the operation mode designating unit 22.

Figure 4B:
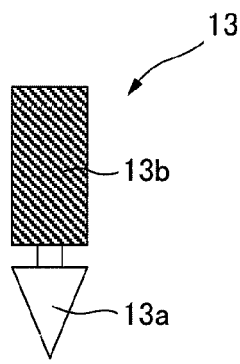
FIG. 4B is another diagram illustrating a three-dimensional model of a tool.

FIG. 4A is a diagram illustrating a three-dimensional model of the tool. In the event the tool 13 is used in deburring work, as illustrated in FIG. 4A, the tool 13 includes a tool processing part 13a that directly contacts the workpiece 14, and a tool non-processing part 13b that does not directly contact the workpiece 14. In FIG. 4A, the interference target designating unit 24 applies settings such that the tool processing part 13a is excluded from the interference target subject in an interference check, which will be described later. Alternately, as illustrated in FIG. 4B, the interference target designating unit 24 may designate the tool non-processing part 13b as an interference target in the interference check. Note that, in the event the tool 13 is used in arc welding work, all of tool 13 is designated as a tool non-processing part by the interference target designating unit 24.

Then, in step S14 of FIG. 2, the interference detection unit 25 checks whether or not the robot 12 or the tool non-processing part 13b and the workpiece 14 or the peripheral devices 15A and 15B interfere with each other, at each teaching point A. FIG. 5 is a conceptual diagram for explaining interference check according to the first embodiment. In FIG. 5, for ease of explanation, one peripheral device 15B is not illustrated.

In FIG. 5, three-dimensional models of the robot 12 and the tool 13 are moved on the display unit 11 from their original positions to a position corresponding to one teaching point A. It naturally follows that the positions of the three-dimensional models of the workpiece 14 and the peripheral device 15A do not change. In this state, the interference detection unit 25 checks whether or not the robot 12 or the tool non-processing part 13b and the workpiece 14 or the peripheral devices 15A and 15B interfere with each other. This check operation is carried out in each teaching point A. Then, in the event the interference detection unit 25 does not detect interference, the step moves on to step S17, and the operation program is complete without correction.

Figure 6A:
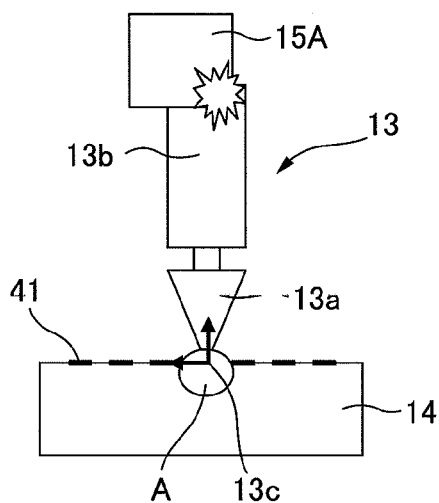
FIG. 6A to FIG. 6E are diagrams illustrating three-dimensional models of a tool, a workpiece and a peripheral device.

FIG. 6A to FIG. 6E are diagrams illustrating three-dimensional models of a tool, a workpiece and a peripheral device. In FIG. 6A, the tool tip point 13c of the tool processing part 13a of the tool 13 is arranged on a teaching point A on the processing line 41 of the workpiece 14. As can be seen from FIG. 6A, in this state, the tool non-processing part 13b of the tool 13 interferes with the peripheral device 15A.

Figure 6B:
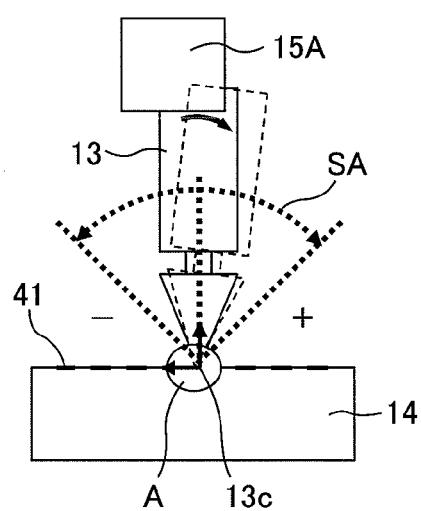

In the event the interference detection unit 25 detects the above interference, the step moves on to step S15 of FIG. 2. In step S15, the non-interference position search unit 26 searches for a non-interference position where the robot 12 or the tool non-processing part and the workpiece 14 or the peripheral devices 15A and 15B do not interfere with each other. As illustrated in FIG. 6B, the non-interference position search unit 26 rotates the tool 13 about its tool tip point 13c in a predetermined search range SA. In FIG. 6B, the tool 13 is rotated clockwise. However, in the predetermined search range SA, the tool 13 may be rotated anti-clockwise as well.

Figure 6D:
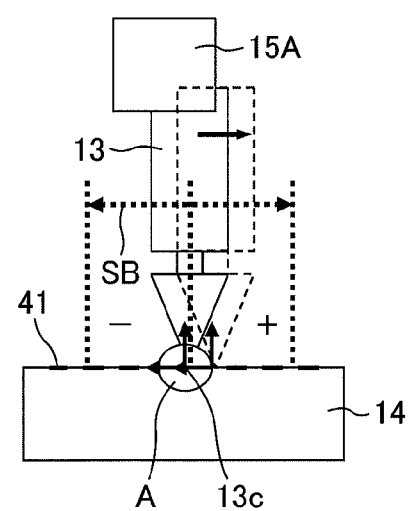
Figure 6C:
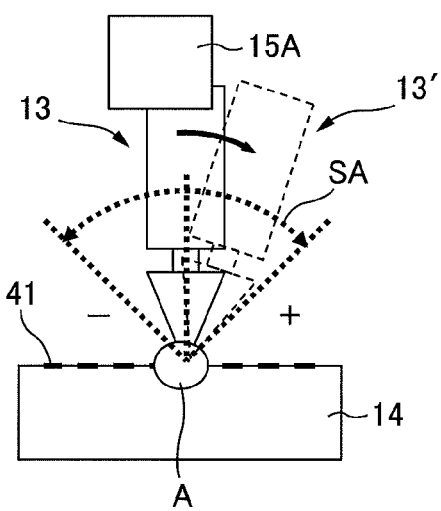
Figure 6E:
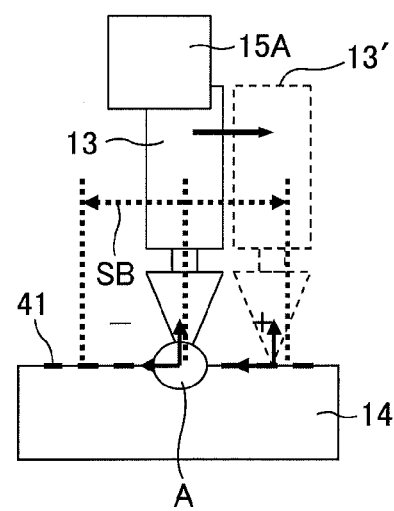

Then, when the tool 13 is rotated to the position illustrated in FIG. 6C, the tool 13 no longer interferes with the peripheral device 15A. The non-interference position search unit 26 searches for such a non-interference position, and displays the tool 13 in the non-interference position as "tool 13'" on the display unit 11. Then, by the correction unit 27, information about the teaching point A, including the position, posture, etc., is corrected so as to correspond to the non-interference position that is searched out (step S16).

The non-interference position search unit 26 may search for a non-interference position through motion other than rotational motion about the tool tip point 13c—for example, through translatory movement. In FIG. 6D, the tool 13 is moved in translatory movement in the right direction, along the processing line 41 of the workpiece 14, in a predetermined search range SB. Then, when the tool 13 is moved in translatory movement up to the position illustrated in FIG. 6E, the tool 13 no longer interferes with the peripheral device 15A. Assuming that this position is a non-interference position, it is possible to display a tool 13' and correct information about the teaching point A by the correction unit 27 (step S16).

Note that, upon moving the tool 13, cases might occur where the robot 12 may be moved following the motion of tool 13. Consequently, a non-interference position searched for so that the tool 13 and the robot 12 do not interfere with the peripheral device 15A and the workpiece 14.

Referring to FIG. 2 again, in step S17, the program generation unit 23 re-generates the operation program of the robot 12 based on the corrected teaching points A. According to the present invention, for all the teaching points A that are generated based on the processing line 41, whether or not the robot 12 or the tool non-processing part 13*b* and the workpiece 14 or the peripheral devices 15A and 15B interfere with each other is checked, and, when there is interference, a non-interference position is searched for. Then, information on a teaching point A which corresponds to a non-interference position is updated, and an operation program for the robot 12 is re-generated based on the updated teaching point A.

In this way, according to the first embodiment of the present invention, it is possible to automatically generate an operation program by which the robot 12 or the tool non-processing part 13*b* and the workpiece 14 or the peripheral devices 15A and 15B do not interfere with each other. As a result of this, the time that has heretofore been required for program check work, teaching correction, etc., can be reduced significantly.

In addition, the first embodiment of the present invention is designed such that the interference target designating unit 24 designates the tool non-processing part 13*b* as an interference target. For example, in the event the tool 13 performs deburring work, the tool 13 must always have the tool processing part 13*a*. In this case, too, with the present invention, it is possible to search for a non-interference position.

Figure 7:
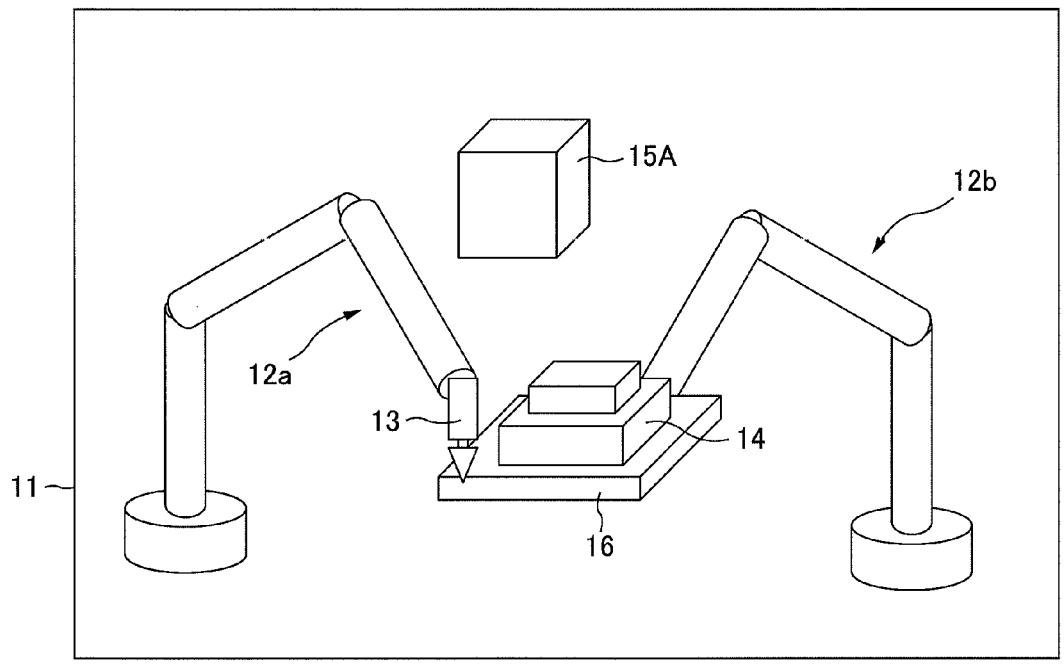
FIG. 7 is a conceptual diagram of a robot programming device according to another embodiment of the present invention.
Figure 8:
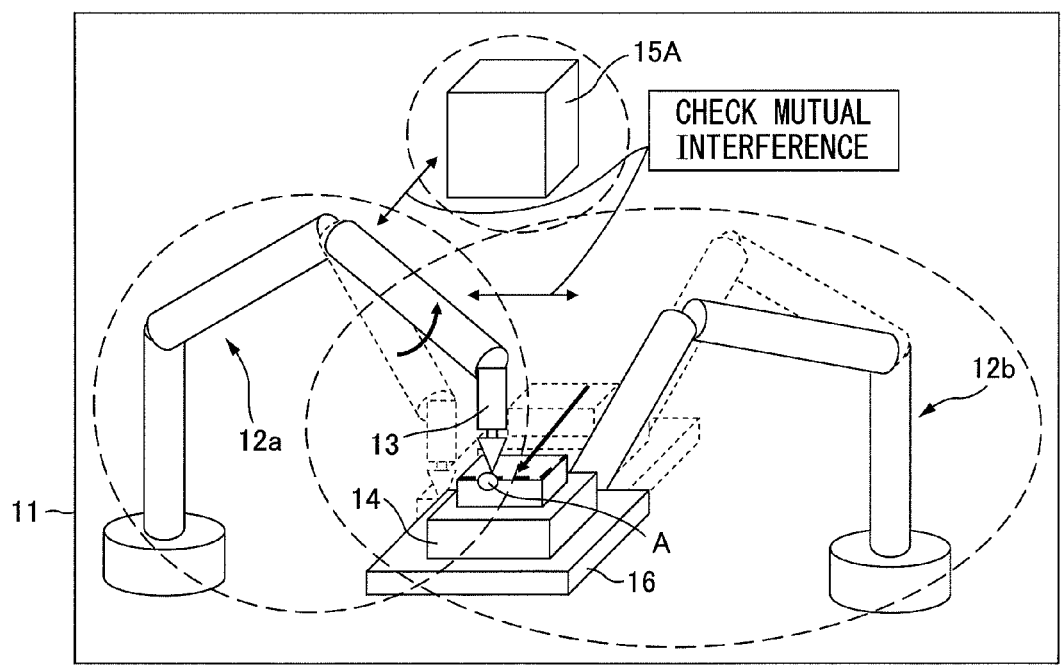
FIG. 8 is a conceptual diagram for explaining interference check according to another embodiment.

FIG. 7 is a conceptual diagram of a robot programming device based on another embodiment of the present invention, and FIG. 8 is a conceptual diagram for explaining interference check according to another embodiment. As illustrated in FIG. 7, according to another embodiment, the tool 13 is attached to the tip of the robot 12. Then, the workpiece 14 is mounted on the base 16, which is attached to the tip of another robot 12*b*, provided as a peripheral device.

According to another embodiment illustrated in FIG. 7, the operation program of the robot 12 is generated in approximately the same way as illustrated in FIG. 2. However, as can be seen from FIG. 8, according to another embodiment, in step S14, the interference detection unit 25 checks whether or not the robot 12*a* or the tool non-processing part 13*b* and the robot 12*b*, the base 16, the workpiece 14 or the peripheral device 15A interfere with each other. Then, the non-interference position search unit 26 searches for a non-interference position where the robot 12*a* or the tool non-processing part 13*b* and the robot 12*b*, the base 16, the workpiece 14 or the peripheral device 15A do not interfere with each other, and information on the teaching points A is updated based on the non-interference position.

Consequently, according to another embodiment illustrated in FIG. 7, even when the workpiece 14 is held by another robot 12*b* that is provided as a peripheral device, it is possible to automatically generate a program by which the robot 12*a* or the tool non-processing part 13*b* and the robot 12*b*, the base 16, the workpiece 14 or the peripheral device 15A do not interfere with each other. As a result of this, according to another embodiment illustrated in FIG. 7, it is obvious that the time that has heretofore been required for program check work, teaching correction, etc., can be reduced significantly.

Figure 9:
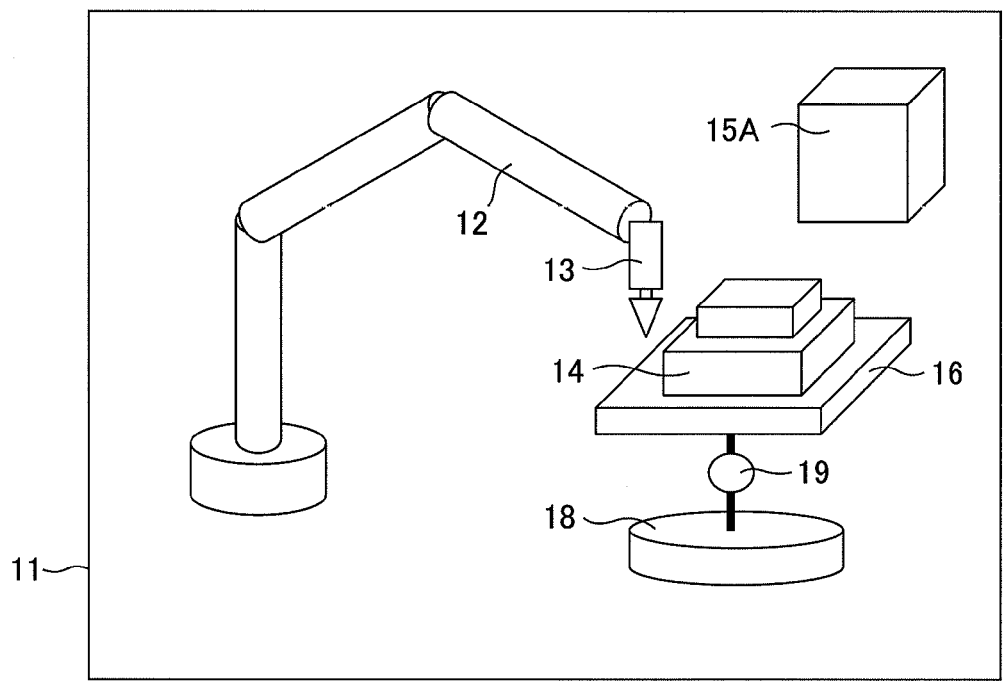
FIG. 9 is a conceptual diagram of a robot programming device according to yet another embodiment of the present invention.
Figure 10:
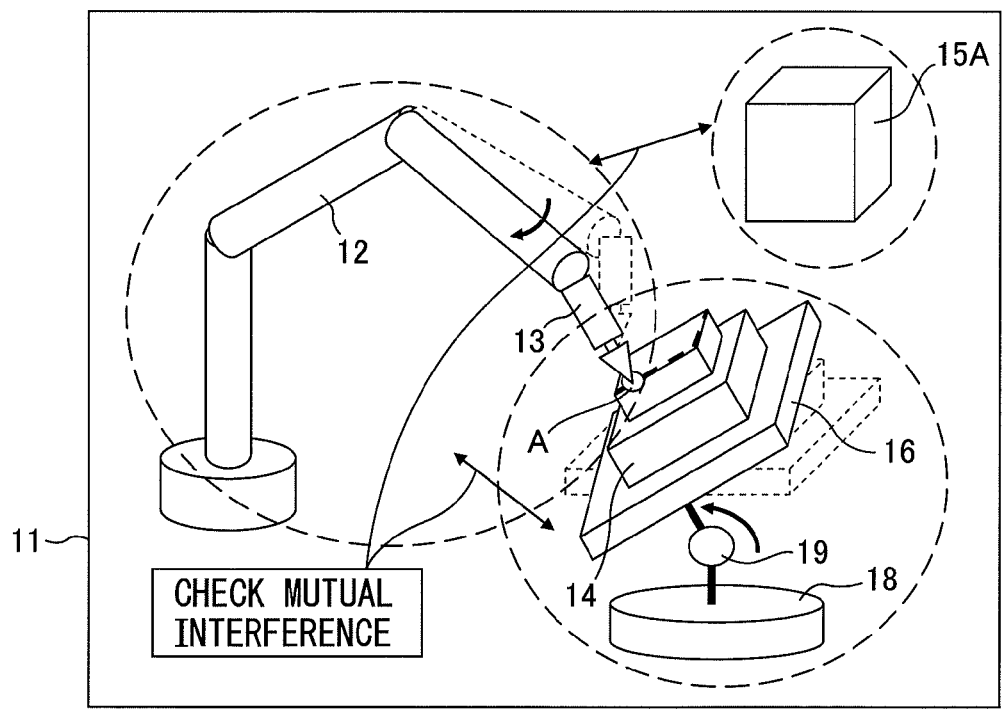
FIG. 10 is a conceptual diagram for explaining interference check according to yet another embodiment.

FIG. 9 is a conceptual diagram of a robot programming device based on yet another embodiment of the present invention, and FIG. 10 is a conceptual diagram for explaining interference check according to yet another embodiment. As illustrated in FIG. 9, the workpiece 14 is mounted on the base 16, which is attached to the tip of a positioner 18 that is provided as a peripheral device. The positioner 18 is a device that can rotate the base 16 about a joint 19 and fix the base 16 in a desired position.

With yet another embodiment illustrated in FIG. 9, the operation program for the robot 12 is generated in approximately the same way as illustrated in FIG. 2. However, as can be seen from FIG. 10, according to yet another embodiment, in step S14, the interference detection unit 25 detects whether or not the robot 12 or the tool non-processing part 13*b* and the positioner 18, the base 16, the workpiece 14 or the peripheral device 15A interfere with each other. Then, the non-interference position search unit 26 searches for a non-interference position where the robot 12 or the tool non-processing part 13*b* and the positioner 18, the base 16, the workpiece 14 or the peripheral device 15A do not interfere with each other, and information on the teaching points A is updated based on the non-interference position.

Consequently, according to yet another embodiment illustrated in FIG. 9, even when the workpiece 14 is held by the positioner 18 that is provided as a peripheral device, it is possible to automatically generate a program by which the robot 12 or the tool non-processing part 13*b* and the positioner 18, the base 16, the workpiece 14 or the peripheral device 15A do not interfere with each other. As a result of this, according to yet another embodiment illustrated in FIG. 9, the time that has heretofore been required for program check work, teaching correction, etc., can be reduced significantly.

Figure 11:
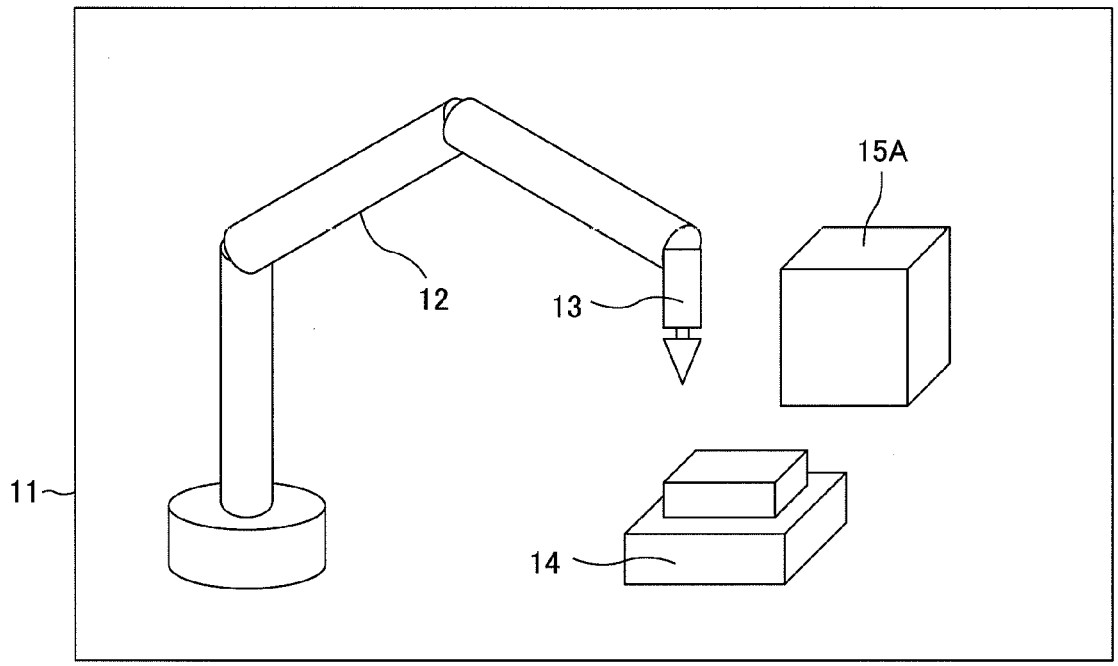
FIG. 11 is a conceptual diagram of a robot programming device based on a second embodiment of the present invention.
Figure 12:
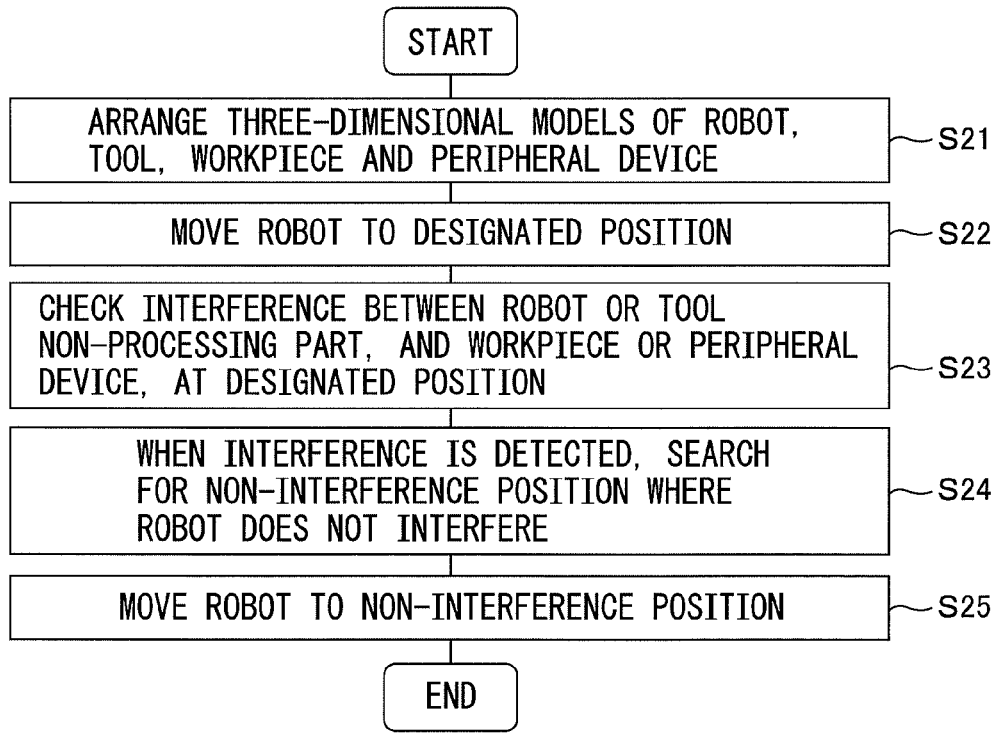
FIG. 12 is a flowchart illustrating operations of the robot programming device illustrated in FIG. 11.
Figure 13:
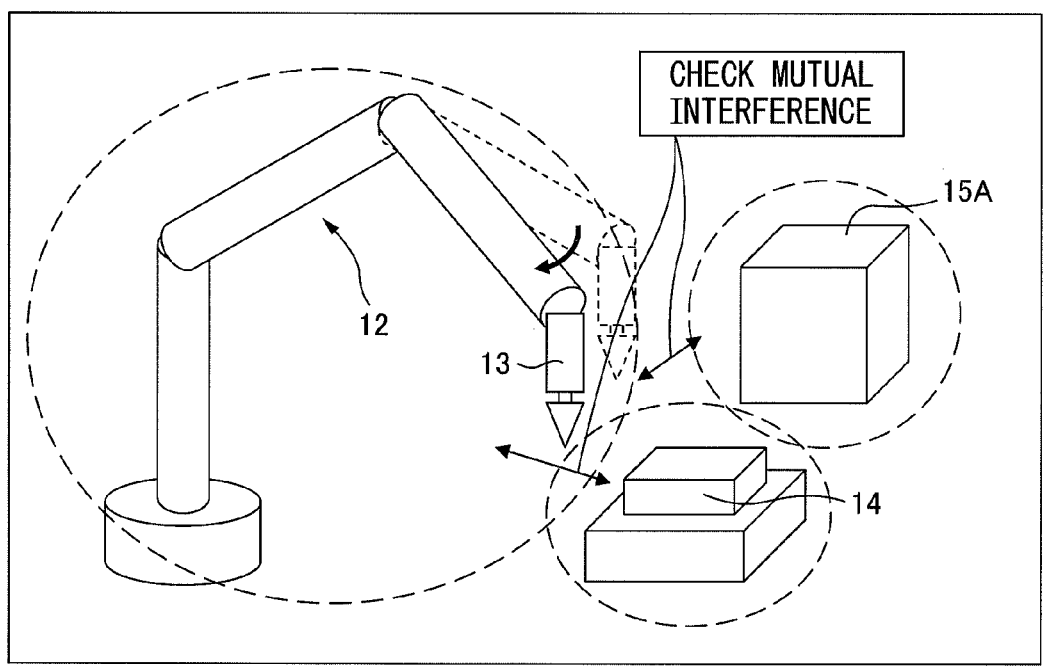
FIG. 13 is a conceptual diagram for explaining interference check according to the second embodiment.

FIG. 11 is a conceptual diagram of a robot programming device based on a second embodiment of the present invention, and is approximately the same as in FIG. 1. Then, FIG. 12 is a flowchart illustrating the operations of the robot programming device according to the second embodiment. Furthermore, FIG. 13 is a conceptual diagram for explaining interference check according to the second embodiment.

As illustrated in FIG. 12, also with the second embodiment, first, in step S21, three-dimensional models of the robot 12, the tool 13, the workpiece 14 and the peripheral device 15A are displayed on the display unit 11.

Then, in step S22, the moving unit 28 of the control device 20 (see, for example, FIG. 1) moves the three-dimensional model of the robot 12 to an arbitrary designated position on the display unit 11. Assuming that the designated position is located in a position not contacting the workpiece 14 in the three-dimensional space. As can be seen from FIG. 13, in step S22, the robot 12 is moved as indicated by the curved arrow.

As explained earlier with reference to FIG. 4A and FIG. 4B, the interference target designating unit 24 applies settings such that the tool processing part 13*a* of the tool 13 is excluded from the interference target in interference check. Alternately, as illustrated in FIG. 4B, the interference target designating unit 24 may designate the tool non-processing part 13*b* as an interference target in interference check.

Then, in step S23, as explained earlier, the interference detection unit 25 checks whether or the not robot 12 or the tool non-processing part 13*b* and the workpiece 14 or the peripheral device 15 A interfere with each other (see, for example, FIG. 13). Then, in the event the interference detection unit 25 detects interference, the step moves on to step S24.

Then, in step S24, in the same way as described earlier, the non-interference position search unit 26 searches for a non-interference position where the robot 12 or the tool non-processing part 13b and the workpiece 14 or the peripheral device 15A do not interfere with each other. FIG. 14A to FIG. 14D are diagrams to illustrate three-dimensional models of the tool and the peripheral device, and, as illustrated with the solid lines, the tool 13 interferes with the peripheral device 15A. With reference to these drawings, the operations of the non-interference position search unit 26 will be described briefly.

Figure 14A:
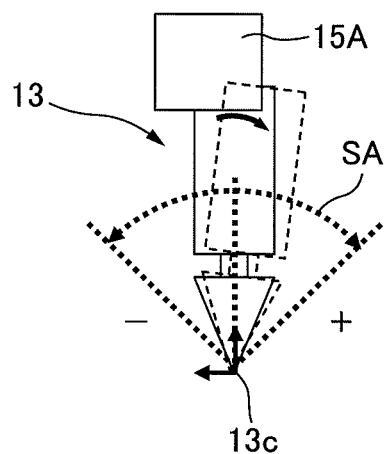
FIG. 14A to FIG. 14D are diagrams illustrating three-dimensional models of a tool and a peripheral device.

In FIG. 14A, the non-interference position search unit 26 rotates the tool 13 about its tool tip point 13c, in a predetermined search range SA. Then, when the tool 13 is rotated to the position illustrated in FIG. 14B, the tool 13 no longer interferes with the peripheral device 15A. The non-interference position search unit 26 searches for such a non-interference position, and displays the tool 13 in the non-interference position as "tool 13'" on the display unit 11. Then, the correction unit 27 makes corrections such that the designated position matches the non-interference position.

Figure 14C:
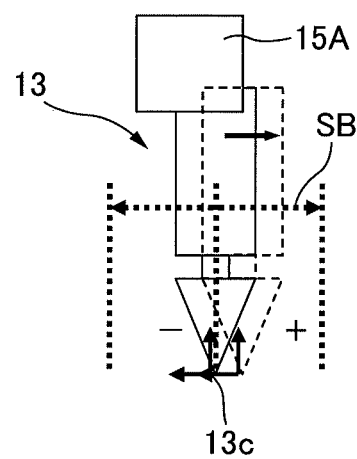
Figure 14B:
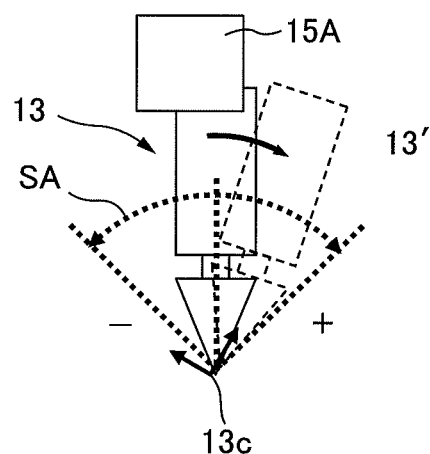
Figure 14D:
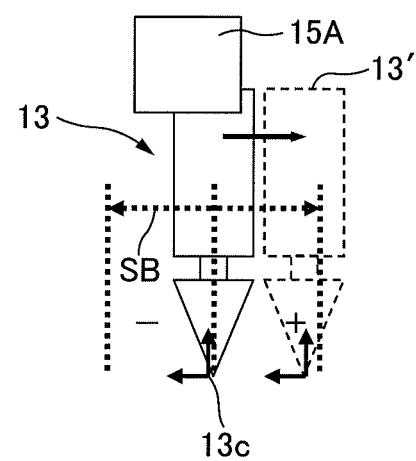

In addition, the non-interference position search unit 26 may search for a non-interference position by moving the tool 13 in translatory movement. In FIG. 14C, the tool 13 is moved in translatory movement in the right direction, along the processing line 41 of the workpiece 14, in a predetermined search range SB. Then, when the tool 13 is moved in translatory movement up to the position illustrated in FIG. 14D, the tool 13 no longer interferes with the peripheral device 15A. The tool 13' is displayed in this position as a non-interference position, and the correction unit 27 performs updating such that the designated position matches the non-interference position. Finally, in step S25 illustrated in FIG. 12, the robot 12 and the tool 13 are moved on the display unit 11 to the non-interference position, which is a newly designated position, and the process is finished.

In this way, according to the second embodiment of the present invention, upon moving the robot 12 to a designated position on a three-dimensional space, if the robot 12 or the tool non-processing part 13b and the workpiece 14 or the peripheral device 15A interfere with each other, a non-interference position is searched for and a designated position is automatically generated. Consequently, in teaching work, the time that has heretofore been required to search for a non-interference position can be reduced significantly.

In addition, the second embodiment of the present invention is also designed such that the interference target designating unit 24 designates the tool non-processing part 13b as an interference target. For example, in the event the tool 13 performs deburring work, the tool 13 must always have the tool processing part 13a. In this case, with the present invention, it is also possible to search for a non-interference position.

The range designating unit 29 of the control device 20 illustrated in FIG. 1 is able to designate search ranges SA and SB. For example, in arc welding, it is preferable to make the range of movement of the tool 13 small, and, in deburring work, it is preferable to make the search range big.

Furthermore, depending on applications such as deburring, arc welding, etc., there are cases where it is not preferable to move the tool 13 and so on in specific directions. In such cases, it is preferable to invalidate rotational motion and translatory movement of the tool 13 and so on in specific directions by the invalidation designating unit 30 illustrated in FIG. 1.

Also, the search order designating unit 31 illustrated in FIG. 1 is able to designate the order of search such that search by translatory movement and rotational motion of the tool 13 and so on in a predetermined direction is carried out preferentially. This order of search is determined depending on applications such as deburring, arc welding, etc.

Also, there are cases where a plurality of non-interference positions are detected within the search ranges SA and SB by the non-interference position search unit 26 illustrated in FIG. 1. In such cases, the search result setting unit 32 may preferably employ only one non-interference position as a search result.

The non-interference position search unit 26 searches for a non-interference position in, for example, a direction other than the directions invalidated by the invalidation designating unit 30, and in the order that is designated by the search order designating unit 31. Then, the search result setting unit 32 sets the non-interference position that is found first, as a search result. In this case, when one non-interference position is detected, the non-interference position search process stops. Consequently, for example, even when search for non-interference positions is not finished in other directions, the search in other directions is skipped.

Alternately, the search result setting unit 32 may calculates the differences between a plurality of non-interference positions and respectively corresponding positions of the robot 12. Then, the search result setting unit 32 may employ the non-interference position where that difference is the minimum, as a search result.

In this way, with the present invention, given that the range designating unit 29, the invalidation designating unit 30, the search order designating unit 31 and the search result setting unit 32 are provided, it is obvious that it is possible to set optimal search content depending on applications such as deburring, arc welding and so on, and adequately search for a non-interference position depending on applications.

Effects of the Invention

According to the first mode, interference between the robot or the tool non-processing part, and the workpiece or the peripheral device, is checked at each teaching point in an operation program that is generated based on a designated processing line, and, in the event there is interference, a non-interference position is searched for and the positions of the teaching points are corrected automatically. Consequently, it is possible to automatically generate a program by which the robot or the tool non-processing part, and the workpiece or the peripheral device, do not interfere with each other. As a result of this, the time that has heretofore been required for program check work, teaching correction and so on can be reduced significantly.

Also, in the event the tool directly contacts and processes the workpiece, or in the event the tool closely processes the workpiece, a tool non-processing part is made an interference target. Consequently, in the event the tool always has a part to interfere with the workpiece such as during deburring work, it is possible to search for a non-interference position adequately. Note that it is equally possible to exclude a tool processing part apart from the tool non-processing part from the interference detection target, instead of making the tool non-processing part an interference target.

According to the second mode, even when a workpiece is held by another robot that is provided as a peripheral device, it is possible to automatically generate a program by which the robot or the tool non-processing part, and the workpiece or the peripheral device, do not interfere with each other. As a result of this, the time that has heretofore been required for program check work, teaching correction, etc., can be reduced significantly.

According to the third mode, even when a workpiece is held by a positioner that is provided as a peripheral device, it is possible to automatically generate a program by which the robot or the tool non-processing part, and the workpiece or the peripheral device, do not interfere with each other. As a result of this, the time that has heretofore been required for program check work, teaching correction, etc., can be reduced significantly.

According to the fourth mode, upon moving the robot to a designated position on a three-dimensional space, if the robot or the tool non-processing part and the workpiece or the peripheral device interfere with each other, a non-interference position is searched for and a designated position is automatically generated. Consequently, in teaching work, the time that has heretofore been required to search for a non-interference position can be reduced significantly.

Also, when the tool directly contacts and processes the workpiece, or when the tool closely processes the workpiece, the tool non-processing part is made an interference target. Consequently, in the event the tool always has a part to interfere with the workpiece such as during deburring work, it is possible to search for a non-interference position adequately. Note that it is equally possible to exclude a tool processing part apart from the tool non-processing part from the interference detection target, instead of making the tool non-processing part an interference target.

According to the fifth mode, it is possible to designate the translation range of the translatory movement and the rotation range of the rotational motion in detail depending on applications such as deburring, arc welding and so on. Consequently, it is possible to adequately search for a position where the robot or the tool non-processing part, and the workpiece or the peripheral device, do not interfere with each other.

According to the sixth mode, in the event it is not preferable to change the posture in a predetermined direction that is determined depending on applications such as deburring, arc welding, etc., it is possible to invalidate translatory movement and rotational motion in the predetermined direction. Consequently, it is possible to adequately search for a position where the robot or the tool non-processing part, and the workpiece or the peripheral device, do not interfere with each other.

According to the seventh mode, in the event it is preferable to preferentially perform search from a predetermined direction that is determined depending on applications such as deburring, arc welding, etc., it is possible to perform search by translatory movement and rotational motion in the predetermined direction in a desired order. Consequently, it is possible to adequately search for a position where the robot or the tool non-processing part, and the workpiece or the peripheral device, do not interfere with each other.

According to the eighth mode, the non-interference position that is found first is set as a search result, or the non-interference position where the difference from the position of the robot is the minimum is set as a search result. Consequently, even when optimal conditions for searching for a non-interference position vary depending on applications such as deburring, arc welding and so on, it is possible to change the method of employing a non-interference position search result, and, by this means, adequately search for a position where the robot or the tool non-processing part, and the workpiece or the peripheral device, do not interfere with each other.

Although the present invention has been described using typical embodiments, a person skilled in the art should understand that the above-described changes, and various other changes, omissions, and additions are possible without departing from the scope of the present invention.

The invention claimed is:

1. A robot programming device configured to teach a robot operation program for
    arranging and displaying, on a screen, three-dimensional models of a robot on which a tool is mounted, a workpiece, and at least one positioner, and
    allowing the tool or the robot to avoid interfering with the workpiece or the positioner and perform processing work of the workpiece,
    the robot programming device comprising:
        a processing line designating unit configured to designate a processing line on a three-dimensional model of the workpiece;
        an operation mode designating unit configured to designate an operation mode, speed, position, and posture of a teaching point that is generated based on the processing line designated by the processing line designating unit;
        a program generation unit configured to generate an operation program for the robot based on the processing line that is designated by the processing line designating unit and the operation mode, speed, position, and posture that are designated by the operation mode designating unit;
        an interference target designating unit configured to, when the tool directly contacts and processes the workpiece or when the tool closely processes the workpiece, designate a tool non-processing part of the tool as an interference target, wherein the tool non-processing part is apart from one part in a three-dimensional model of the tool that directly contacts the workpiece or is close to the workpiece;
        an interference detection unit configured to detect, at the teaching point in the operation program, interference between (a) the robot or the tool non-processing part, and (b) the workpiece or the positioner;
        a non-interference position search unit configured to, when the interference detection unit detects interference, search for a non-interference position where (a) the robot or the tool non-processing part, and (b) the workpiece or the positioner, do not interfere with each other, by carrying out at least one of
        translatory movement, without rotational motion, of the tool from a position of the robot upon interference, and
        rotational motion of the tool along an arc having the tool tip point as the center of rotation; and
        a correction unit configured to correct a position of the teaching point based on a search result by the non-interference position search unit.

2. The robot programming device as claimed in claim 1, wherein the workpiece is held by the positioner.

3. The robot programming device as claimed in claim 1, further comprising:
    a range designating unit configured to designate a translation range of the translatory movement and a rotation range of the rotational motion.

4. The robot programming device as claimed in claim 1, further comprising:
an invalidation designating unit configured to invalidate search by the translatory movement and the rotational motion in a predetermined direction.

5. The robot programming device as claimed in claim 1, further comprising:
a search order designating unit configured to designate an order of search such that search by the translatory movement and the rotational motion in a predetermined direction is carried out with priority.

6. The robot programming device as claimed in claim 1, further comprising:
a search result setting unit configured to, when a plurality of non-interference positions are found by the non-interference position search unit, set, as the search result, a non-interference position that is found first, or
a non-interference position where a difference from positions of the robot corresponding respectively to the plurality of non-interference positions is minimum.

7. A robot programming device configured to teach a robot operation program for
arranging and displaying, on a screen, three-dimensional models of a robot on which a tool is mounted, a workpiece, and at least one positioner, and
allowing the tool or the robot to avoid interfering with the workpiece or the positioner and perform processing work of the workpiece,
the robot programming device comprising:
a moving unit configured to move the robot to a designated position in a three-dimensional space;
an interference target designating unit configured to, when the tool directly contacts and processes the workpiece or when the tool closely processes the workpiece, designate a tool non-processing part of the tool as an interference target, wherein the tool non-processing part is apart from one part in a three-dimensional model of the tool that directly contacts the workpiece or is close to the workpiece;
an interference detection unit configured to detect, at the designated position, interference between (a) the robot or the tool non-processing part, and (b) the workpiece or the positioner;
a non-interference position search unit configured to, when the interference detection unit detects interference, search for a non-interference position where (a) the robot or the tool non-processing part, and (b) the workpiece or the positioner, do not interfere with each other, by carrying out at least one of
translatory movement, without rotational motion, of the tool from a position of the robot upon interference, and
rotational motion of the tool along an arc having the tool tip point as the center of rotation; and
a correction unit configured to correct a position of the designated position based on a search result by the non-interference position search unit.

8. The robot programming device as claimed in claim 7, further comprising:
a range designating unit configured to designate a translation range of the translatory movement and a rotation range of the rotational motion.

9. The robot programming device as claimed in claim 7, further comprising:
an invalidation designating unit configured to invalidate search by the translatory movement and the rotational motion in a predetermined direction.

10. The robot programming device as claimed in claim 7, further comprising:
a search order designating unit configured to designate an order of search such that search by the translatory movement and the rotational motion in a predetermined direction is carried out with priority.

11. The robot programming device as claimed in claim 7, further comprising:
a search result setting unit configured to, when a plurality of non-interference positions are found by the non-interference position search unit, set, as the search result, a non-interference position that is found first, or
a non-interference position where a difference from positions of the robot corresponding respectively to the plurality of non-interference positions is minimum.

* * * * *